United States Patent [19]
Louvel

[11] 3,872,710
[45] Mar. 25, 1975

[54] APPARATUS FOR MEASURING THE INDEX OF FILTERABILITY OF A LIQUID

[75] Inventor: Bernard Louvel, Buros, France

[73] Assignee: Entreprise De Recherches Et D'Activites Petrolieres (ELF), Paris, France

[22] Filed: Feb. 16, 1973

[21] Appl. No.: 332,740

[30] Foreign Application Priority Data
Feb. 28, 1972 France .................. 72.06718

[52] U.S. Cl. ........................ 73/17 R, 73/61.4
[51] Int. Cl. .................................. G01n 25/02
[58] Field of Search .............. 73/61.4, 61 R, 17 R

[56] References Cited
UNITED STATES PATENTS

| | | | |
|---|---|---|---|
| 2,599,742 | 6/1952 | Boucher et al. | 73/61.4 |
| 3,143,876 | 8/1964 | Wallgren | 73/17 R |
| 3,213,668 | 10/1965 | Thompson | 73/17 R |
| 3,292,424 | 12/1966 | Smollett et al. | 73/61 R |
| 3,455,146 | 7/1969 | Smith et al. | 73/61.4 |
| 3,577,765 | 5/1971 | Bertoglio et al. | 73/17 R |

FOREIGN PATENTS OR APPLICATIONS
227,638   2/1969   U.S.S.R. .................. 73/17 R

Primary Examiner—Richard C. Queisser
Assistant Examiner—Joseph W. Roskos
Attorney, Agent, or Firm—Cameron, Kerkam, Sutton, Stowell & Stowell

[57] ABSTRACT

The index of filterability of a liquid such as a hydrocarbon and more especially a fuel oil or gas oil is measured continuously or non-continuously by means of an apparatus comprising a distributor for delivering liquid under a standardized pressure into a test cell which is divided into two sections by a calibrated filter, a temperature-sensing element placed in the flowing stream of liquid in the vicinity of the filter, a flow meter for measuring the flow rate across the filter, a system for detecting a stoppage or drop in rate of flow of the liquid within the flow meter and delivering an electrical signal, an element for heating the test cell which is controlled by the signal delivered by the flow detector and a unit for cooling the cell.

11 Claims, 2 Drawing Figures

APPARATUS FOR MEASURING THE INDEX OF FILTERABILITY OF A LIQUID

This invention relates to an apparatus for the continuous or non-continuous measurement of the index of filterability of a liquid, especially a hydrocarbon and more particularly a fuel oil or gas oil. The index of filterability is characterized by the limiting temperature above which a filter of predetermined caliber corresponding to a very precise standard becomes clogged or more exactly reduces the time of flow of a given quantity of liquid through said filter to a unit of time which is at present 1 minute. This occurs under the action of crystallization of certain substances which are present in the liquid under test and in particular of the paraffins, the liquid being subjected to a pressure difference on each side of the filter which is equal at the present time to 20 cm of water with respect to atmospheric pressure. The invention is also concerned with methods of measurement which are carried out by means of the apparatus under consideration.

One semi-automatic apparatus which performs a measurement of this type under laboratory conditions is already known. This apparatus consists of a cooling set and a water-jet pump which is capable of producing a standardized vacuum of 20 cm of water. The liquid to be tested is accordingly sucked through a screened pipe or a standardized filter, the time of suction of the liquid being measured by means of a clock which may be electronic or of any other type. If the liquid has not passed beyond a predetermined reference mark at the end of the time interval considered, that is to say after 60 seconds, the temperature of said liquid as measured corresponds to the index of filterability to be determined. In this known apparatus, the test is preferably started at the temperature of the liquid which is required by the user; at each ineffective test, the temperature is reduced in steps, especially degree by degree, until the critical point which defines the index is determined.

The aim of the present invention is to provide an apparatus for measuring the temperature of filterability of a liquid which, while fully complying with the specifications of the standard imposed, makes it possible to follow the progressive variation of the temperature of filterability by means of measurements performed either continuously or non-continuously. This apparatus is accurate, of simple design and inexpensive to produce; it can be employed directly on production or work sites and is no longer restricted to the laboratory.

To this end, the apparatus under consideration essentially comprises a distributor for delivering liquid under a standardized pressure into a test cell which is divided into two sections by a calibrated filter, a temperature-sensing element placed in the flowing stream of liquid in the vicinity of the filter, a flow meter for measuring the flow rate across the filter, a system for detecting the stoppage or drop in rate of flow of the liquid within the flow meter and delivering an electrical signal, an element for heating said cell which is controlled by the signal delivered by the flow detector and a unit for cooling said cell.

In a preferred embodiment of the invention, the flow meter is constituted by an optical measuring system placed on the liquid flow path.

In accordance with a particular feature, the liquid distributor is constituted by a constant-level drum which is mounted above the cell, said distributor being intended to comprise a feed pipe which passes through a pre-filter for the retention of impurities and a coalescer for the removal of water in suspension in the liquid to be tested.

Apart from these characteristic features, an apparatus for measuring the index of filterability as constructed in accordance with the invention has a number of additional related features which should preferably be considered in combination but may be taken separately if necessary and are concerned in particular with the following points:

— the cooling unit is constituted by a heat exchanger placed around the test cell and supplied with a cooling fluid through a cooling set, by one or a number of Peltier-effect batteries, or by a Ranque tube. Advantageously, the cooling fluid supplied to the exchanger is glycolated water;

— the heating element of the test cell is constituted by resistors in the form of wires or plates to which voltage is applied by a control relay actuated by the signal derived from the detector;

— determination of temperature within the flowing stream of liquid is carried out by means of a thermocouple, a resistance probe or by measuring the variation of the base-emitter junction of a transistor;

— the liquid distributor is constituted by any constant-pressure or constant-vacuum system such as a pump, a static pressure, a water-jet pump, a vacuum pump;

— the system for detecting stoppage of the flow of liquid within the flow meter is constituted by any system such as an optical system based on the principle of absorption or reflection of light derived from a light source, a magnetic system or electric system.

Further properties of a measuring apparatus as constructed in accordance with the invention and of the method adopted for the practical utilization of said apparatus will become apparent from the following description of one exemplified embodiment which is given by way of indication without any implied limitation, reference being made to the accompanying drawings, wherein.

Figure 1:
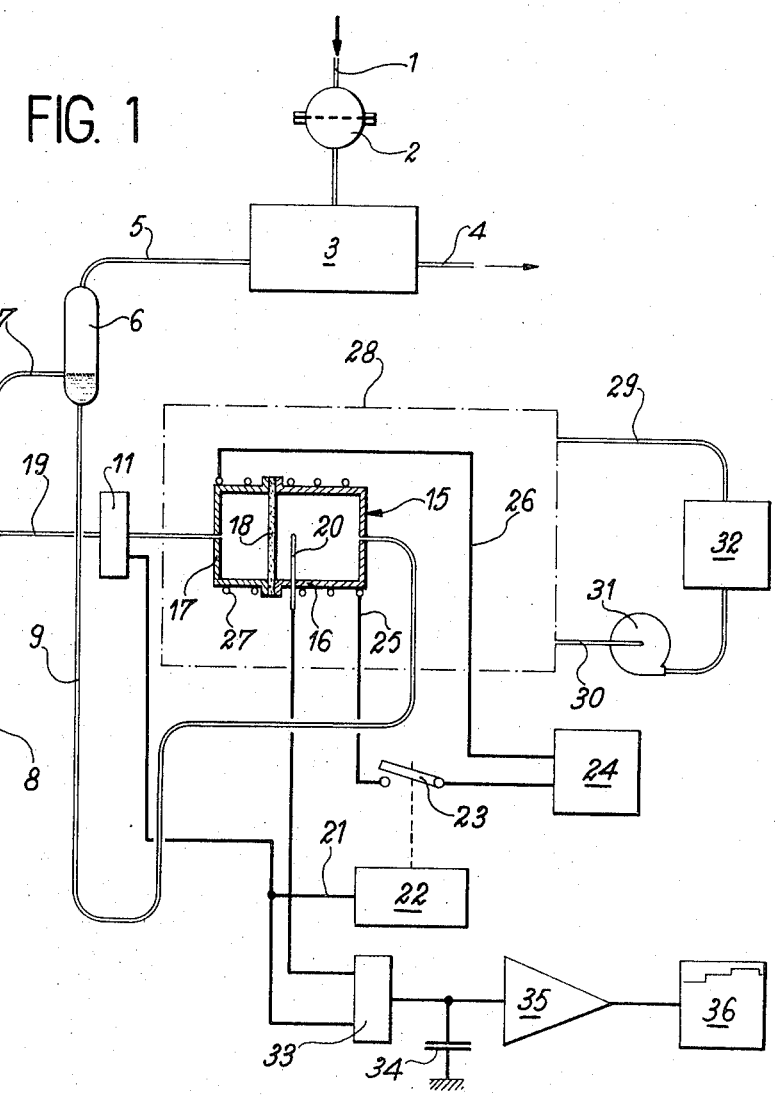
FIG. 1 is a general arrangement diagram of the apparatus under consideration.

In FIG. 1, the reference 1 designates a pipe for the supply of a liquid and especially a fuel oil or a gas oil in which it is desired to measure either in continuous or non-continuous operation the variations in the index of filterability as a function of time, taking account in particular of the variations which occur in the composition of said liquid. The pipe 1 first opens into a pre-filter 2 which is intended to retain any possible impurities contained in said liquid. The outlet of the filter 2 is connected to a coalescer 3 or equivalent element for separating the liquid from the water in suspension in this latter, said water being removed by means of a pipe 4 whilst the liquid which is thus refined is discharged from the coalescer via the pipe 5. Said pipe 5 is connected to the top end of a regulating drum 6 fitted with an overflow pipe 7 which serves to maintain a constant level of liquid within the drum 6. The end of the overflow pipe 7 is connected to a pipe 8 from which the liquid discharged from the drum 6 is returned to the main utilization circuit.

The liquid to be tested which is supplied from the drum 6 via a pipe 9 passes through a test cell 15. Said cell is formed by a metallic casing consisting of two sections 16 and 17 which are separated from each other by a transverse partition-wall 18 constituted by a filter having a size of mesh which corresponds to a well-determined standard. In accordance with this standard, the constant level of the liquid within the drum 6 is located above the cell 15 and at a height such that the pressure of liquid within this latter should correspond at the present time to a pressure of 20 cm of water. The liquid which has passed through the filter 18 is then collected by means of an outlet pipe 19 on which is placed a flow-measuring element. In a preferred embodiment, said element is constituted by a photoelectric system 11 which delivers a direct-current signal representing the rate of flow. The function of this signal will be explained in greater detail hereinafter. The output of said element is in turn connected to the pipe 8 through which the liquid returns to its normal utilization circuit.

The equipment of the measuring apparatus under consideration is completed by means of a temperature-sensing element 20 consisting of a thermocouple or a resistance probe for continuously measuring the temperature of the liquid; moreover, the output of the system 11 which performs the function of detector is connected by means of a lead-wire 21 to an electromagnetic relay 22, the contact 23 of which is connected to the terminals of an electric supply unit 24. Said unit is connected by the lead-wires 25 and 26 to a heating element such as a resistance wire 27 which is wound on the external surface of the test cell 15 and serves to adjust the temperature of the liquid within this latter. Finally, the cell 15 is surrounded externally by a heat exchanger comprising a shell 28 for the circulation of a cooling fluid and especially glycolated water which is admitted into said shell via the line 29 and discharged therefrom via the line 30, said lines 29 and 30 being mounted in a circuit comprising a pump 31 and a cooling set 32 which make it possible to vary the temperature of said fluid.

The operation of the measuring apparatus in accordance with the invention may already be deduced from the foregoing: in a first step, the cooling set 32 is regulated in such a manner as to ensure that the glycolated water which circulates within the shell 28 around the test cell 15 is brought to a very low temperature, thereby permitting abrupt cooling of the liquid which passes through said cell and the index of filterability of which is to be determined. This liquid which circulates within the cell is thus cooled until it attains the critical temperature of filterability at which the rate of flow of said liquid through the filter 18 becomes practically zero. The stoppage or drop in the rate of flow of the liquid through the filter is then detected by the system 11 which delivers a signal in the form of a pulse. Said pulse is transmitted to the coil of the relay 22 which initiates closure of the electric circuit of the resistance wire 27 by means of the contact 23. The test cell 15 is rapidly heated by said resistance wire over a predetermined period of time in order to cause the temperature of the liquid within said cell to deviate in value from the temperature which measures the index of filterability while correctly dissolving the paraffins which have previously clogged the pores of the filter 18. The detecting system 11 also transmits an opening pulse to an analog gate 33 which serves to store the value of voltage corresponding to the temperature of filterability in a capacitor 34. Said capacitor stores the temperature between two measurements. A reading amplifier 35 then delivers the signal which serves to drive a recorder or any data-processing system 36.

Figure 2:
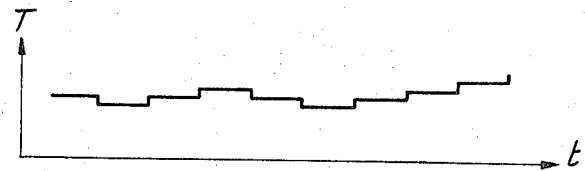
FIG. 2 is an example of a curve which gives as a function of time the temperatures which measure the index of filterability of a liquid having variable inherent characteristics.

Recording of the temperature thus takes place in the form of a series of square waves having well-defined transitions corresponding to the storage of the temperature of filterability. The curve obtained therefore measures the temperature, that is to say the index as a function of time; the profile of said curve can be as illustrated by way of example in FIG. 2 in the case of a given liquid having characteristics and therefore an index of filterability which vary in time. If the flow detector is sufficiently sensitive and if the test cell has low thermal inertia, the square waves obtained can have a very small amplitude corresponding in particular to a temperature variation of less than 1°.

It is readily apparent that the invention is not limited solely to the exemplified embodiment which has been more especially described with reference to the drawings but extends to all alternative forms and in particular to those which correspond to technologically equivalent arrangements in different sections of the apparatus. In particular, the propulsion of the liquid through the measuring cell could be carried out by any constant-pressure of constant-vacuum system such as a pump, a water-jet pump or a static pressure. Cooling of the test cell can be carried out by means of a heat exchanger which is supplied either by a cooling set as in the example herein described or by one or a number of Peltier-effect batteries or alternatively by making use of a Ranque tube; this latter is a known device which makes it possible to produce low temperatures by heating and expansion of a gas jet which is displaced in a helical path within a tube having an elliptical cross-section. The rate of flow of the liquid can be measured both by means of a float-type rotameter and by any other type of flow meter, for example of the heating-wire type; it is possible by this means either to measure the variations in pressure upstream and downstream of the test cell or to take a direct measurement of the thickness of a flowing stream of liquid by absorption of light. Detection and visualization of stoppage of the flow meter can be obtained by any suitable optical system based on the properties of absorption or reflection of light produced by a light source, or alternatively by magnetic detection. Finally, heating of the test cell which contains the filter can be carried out by means of resistance-type heating elements in the form of either wires or plates, or by making use of the cell itself as an electrical resistance which is inserted in an electric circuit; the temperature can be measured either by a thermocouple or a resistance probe, or even by measuring the variation of the base-emitter junction of a transistor.

Similarly, a further example of construction consists in controlling the heating in such a manner as to clear the filter for a short period of time; the temperature in this case fluctuates about the temperature of filterability. In this case, the fuel oil to be analyzed within the cell 15 can be rapidly renewed by means of a system of valves actuated from a control station.

Consideration can likewise be given to another mode of construction of the apparatus in which the temperature of the liquid in the vicinity of the filter can be adjusted to a predetermined value of flow rate which corresponds substantially to the temperature of filterability. Provision is thus made for continuous recording of the measurement without any need for square waves.

1. An apparatus for measuring the index and progressive variation of filterability of a liquid and especially a gas oil, wherein said apparatus comprises a distributor for delivering liquid under a standardized pressure into a test cell which is divided into two sections by a calibrated filter, a temperature-sensing element placed in the flowing stream of liquid in the vicinity of the filter, a flow meter for measuring the flow rate across the filter, a system for detecting the stoppage or drop in rate of flow of the liquid within the flow meter and delivering an electrical signal, an element for heating said cell which is controlled by the signal delivered by the flow detector and a unit for cooling said cell, said liquid distributor including a constant-level drum mounted above the cell, said distributor further comprising a feed pipe which passes through a pre-filter for the retention of impurities and a coalescer for the removal of water in suspension in the liquid to be tested.

2. A measuring apparatus according to claim 1, wherein the flow meter is constituted by a float-type rotameter, the float being interposed in respect of a predetermined rate of flow through said flow meter on the path of a light beam between a source and a photoelectric receiver.

3. A measuring apparatus according to claim 1, wherein the cooling unit is constituted by a heat exchanger placed around the test cell and supplied with a cooling fluid through a cooling set, by one or a number of Peltier-effect batteries, or by a Ranque tube.

4. A measuring apparatus according to claim 3, wherein the cooling fluid supplied to the heat exchanger is glycolated water.

5. A measuring apparatus according to claim 1, wherein the heating element of the test cell is constituted by resistors in the form of wires or plates or by the resistance of the cell itself to which voltage is applied by a control relay actuated by the signal derived from the detector.

6. A measuring apparatus according to claim 1, wherein the determination of temperature within the flowing stream of liquid is carried out by means of a thermocouple, a resistance probe or by measuring the variation of the base-emitter junction of a transistor or by any other thermometer.

7. A measuring apparatus according to claim 1, wherein the liquid distributor is constituted by any constant-pressure or constant-vacuum system such as a pump, a static pressure, a water-jet pump, a vacuum pump.

8. A measuring apparatus according to claim 1, wherein the system for detecting the state of flow of the liquid within the flow meter is constituted by any system such as an optical system based on the principle of absorption or reflection of light derived from a light source, a magnetic system or electric system.

9. A method for measuring the index and progressive variation of filterability of a liquid comprising the steps of delivering a liquid under a standardized pressure into a test cell divided into two sections by a calibrated filter, determining the temperature of the flowing stream of liquid in the vicinity of the filter, measuring the flow rate across the filter, cooling the cell, detecting the stoppage or drop in rate of flow of the liquid across the filter as an electrical signal, heating the cell under control of the electric signal and controlling the temperature of the fluid at the level of the calibrated filter in dependence on a predetermined value of flow rate corresponding to the index of filterability.

10. A method according to claim 9, including the step of controlling fluctuations of the temperature of the fluid at the level of the filter about the temperature of filterability according to the sequences controlled by the measurements of the flow rate.

11. A method according to claim 9 the measurement of flow rate is based on either pressure or level of the liquid.

* * * * *